United States Patent [19]

Lehner

[11] Patent Number: 5,342,009
[45] Date of Patent: Aug. 30, 1994

[54] HOLDING DEVICE FOR DRINK CONTAINERS

[75] Inventor: Heinz Lehner, Lauf, Fed. Rep. of Germany

[73] Assignee: EuWe Eugen Wexler GmbH, Fed. Rep. of Germany

[21] Appl. No.: 96,475

[22] Filed: Jul. 22, 1993

[30] Foreign Application Priority Data

Jul. 25, 1992 [DE] Fed. Rep. of Germany ....... 4224700

[51] Int. Cl.5 .............................................. A47F 5/00
[52] U.S. Cl. ................... 248/311.2; 248/293; 248/284
[58] Field of Search ............. 248/311.2, 309, 284, 248/293; 297/188, 191, 194

[56] References Cited

U.S. PATENT DOCUMENTS

| | | | |
|---|---|---|---|
| 1,188,671 | 6/1916 | Milmore | 248/311.2 X |
| 1,746,792 | 2/1930 | Rastetter | 248/293 |
| 1,906,220 | 5/1933 | Allen | 248/293 |
| 2,071,257 | 2/1937 | Hansen | 248/293 X |
| 2,649,270 | 8/1953 | Franks | 248/311.2 |
| 2,791,392 | 5/1957 | Black | 248/293 |
| 2,895,702 | 7/1959 | Pierce | 248/293 |
| 4,191,350 | 3/1980 | Ormond | 248/311.2 X |
| 4,583,707 | 4/1986 | Anderson | |
| 5,014,956 | 5/1991 | Kayali | 248/311.2 |
| 5,072,909 | 12/1991 | Huang | |
| 5,141,194 | 8/1992 | Burgess et al. | 248/150 X |
| 5,238,211 | 8/1993 | Borovski | 248/293 X |

FOREIGN PATENT DOCUMENTS

0447263A2 3/1991 European Pat. Off. .

Primary Examiner—Karen J. Chotkowski
Attorney, Agent, or Firm—Laff, Whitesel, Conte & Saret

[57] ABSTRACT

A holding device for drink containers in particular for installing in vehicles comprises a fastening panel, a tray supported thereto to be retracted or folded-out for receiving the bottom of the drink container as well as a holder, which is at least partially annularly shaped and which is supported above the tray on the fastening panel to pivot between a folded-out position and a retracted position. In its retracted position the holder is covered by the tray like forming a lid. The tray and the holder are connected with each other via at least one connecting lever in such an articulated manner that with the retracting and folded-out movement, respectively, of the tray the holder is automatically movable into its retracted and folded-out position, respectively.

8 Claims, 2 Drawing Sheets

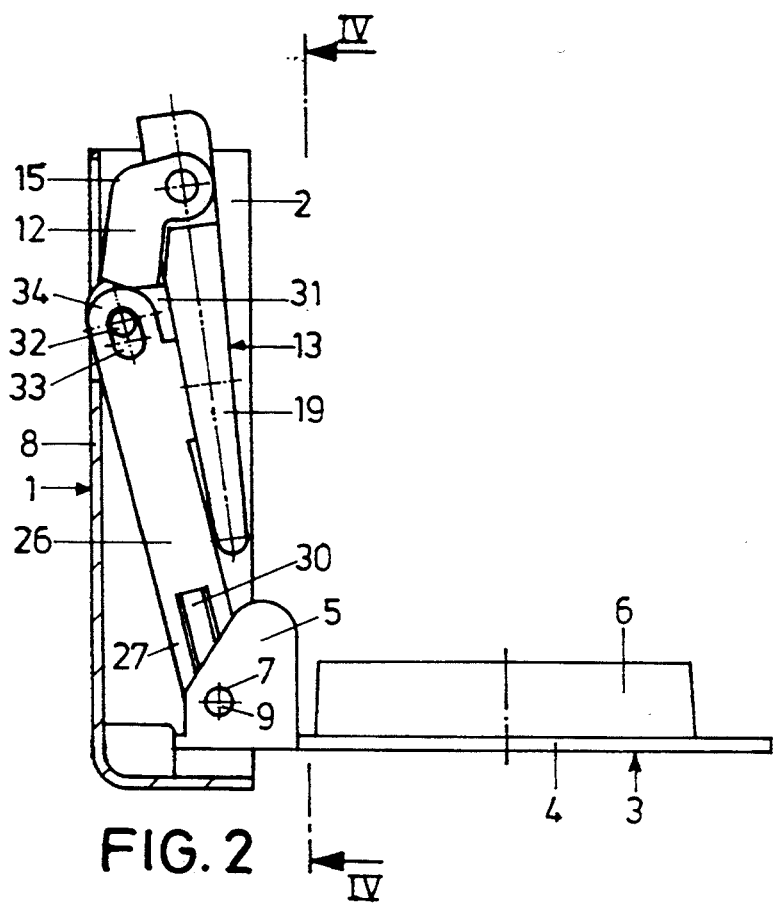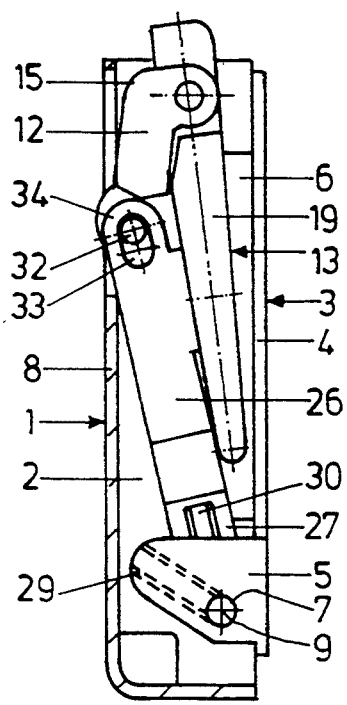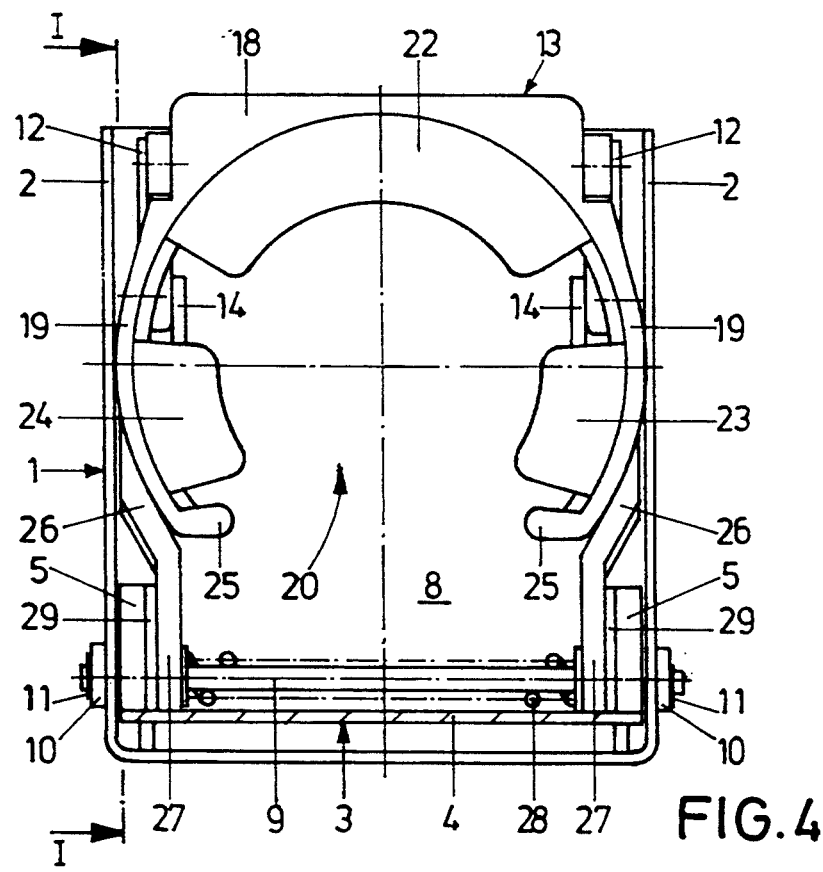

HOLDING DEVICE FOR DRINK CONTAINERS

FIELD OF THE INVENTION

The invention relates to a holding device for drink containers in particular for installing in vehicles comprising a fastening panel, a tray supported thereto, which is supported on the fastening panel to pivot between a folded-out and a retracted position for receiving the bottom of the drink container, and a holder, which is substantially at least partially annularly shaped and which grasps the side wall of the drink container, which holder is supported above the tray on the fastening panel to pivot between a folded-out position for holding the drink container and a retracted position, whereby in its retracted position the holder is covered by the tray like forming a lid.

BACKGROUND OF THE INVENTION

Holding devices of this type for drink containers, which are designed in particular for being installed in vehicles, have been known for a long time. Since such holding devices are used only temporarily, e.g. if a drink is to be taken during driving, otherwise, however, they are merely disturbing and are not unrisky with regard to safety requirements due to their protruding parts, they are as a rule retractable. To this end the tray pivotably supported on the fastening panel, which tray serves for receiving the bottom of a drink container as well as the holder equally pivotably supported on the panel, which holder serves for grasping the side wall of the drink container, are pivotable between a retracted and a folded-out pivoting position. In order to give the holding device in its closed state an appearance which is as smooth as possible, at first the substantially partially annularly shaped holder is retracted, over which then the tray provided with a smooth bottom can be folded like forming a lid. Together with the fastening panel substantially formed as an open, flat casing the holding device thus comprises in its closed state a flat cuboidal form.

With the known holding device it is disadvantageous that its tray and holder must be retracted in two separate steps of operation, which in addition must be carried out in the correct sequence—first the holder, then the tray.

SUMMARY OF THE INVENTION

With the aforesaid considerations in mind it is the object of the invention to improve a holding device of the generic type in such a manner that the operating convenience is enhanced during its operation.

This object is achieved in accordance with the invention by a holding device, wherein by the articulated connection of the holder with the tray via at least one connecting lever the holder is automatically operated in such a manner that with the retracting and folded-out movement, respectively, of the tray it is automatically movable into its retracted and folded-out position, respectively. Insofar the entire holding device can be retracted or folded-out, respectively, by one single step of operation. Malfunctioning is practically impossible. In this connection it must be noted that with an operation of the holder also the tray is retracted at least partially, so that a complete closing of the holding device is possible by a further operation of the tray, without the necessity of undoing the preceding steps of operation.

According to a preferred embodiment of the invention the tray and each of the connecting levers are pivotably supported on the fastening panel on a common bearing axle and are pivotably coupled via a releasable pivot locking.

By this embodiment of the holding device it is possible to retract the holder separately from the tray, so that the tray is freely accessible from above and can serve for example as a place of deposit for small parts. Here it is furthermore advantageous that based on such a position of holder and tray the pivot locking of the tray with the holder is again automatically engaged after the tray is retracted. When subsequently folding out the tray, also the holder is moved to its folded-out position. Thus the holding device is automatically operated with its basic function (simultaneous folded-out and retracting movement of tray and holder).

Not least by the common support of the tray and the connecting lever on one bearing axle a particularly easy construction is achieved.

Advantageous further improvements of the releasable pivot locking between the tray and the at least one connecting lever are characterized in that the releasable pivot locking is formed by a snap engagement according to the type of a groove-and-tongue-coupling between each of the connecting levers and respectively associated bearing projections receiving the common bearing axle on the tray. Besides each of the connecting levers can be spring-loaded in the locking direction.

According to another preferred embodiment of the invention each of the connecting levers is connected with the holder via a rotary-slide-joint, which joint is arranged on the fastening panel at a certain distance from the link point of the holder with regard to the fastening panel.

By the stated arrangement of the rotary-slide-joint at a distance from the link point of the holder with regard to the fastening panel the holder on the one hand is supported in its folded-out position from below by the connecting lever and on the other hand is neatly guided in particular during retraction movement separately from the tray.

By the pivotable link of the holder on the fastening panel via at least one articulated lever the link point of the holder can be shifted upward during retraction, as a result of which all components of the folding mechanism including the holder itself can be arranged tightly adjacent to each other in the retracted position. With this the holding device according to the invention is especially compact in the retracted state of the holder and the tray.

Further features, details and advantages of the invention will become apparent from the ensuing description of one example of embodiment taken in conjunction with the drawing.

BRIEF DESCRIPTION OF THE DRAWING

FIG. 1 to 3 show vertical sections through the holding device according to the invention along the line I—I according to FIG. 4 in different folding positions of the tray and holder, FIG. 4 shows a vertical section through the holding device along the line IV—IV according to FIG. 2

DESCRIPTION OF THE PREFERRED EMBODIMENT

Figure 1:
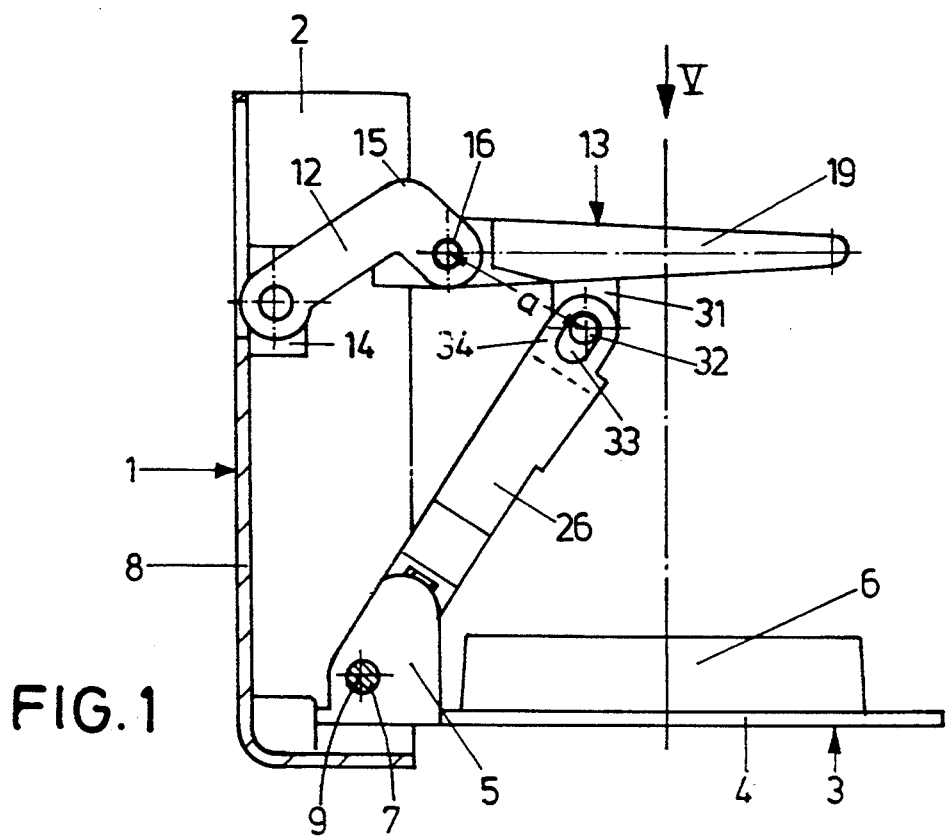

As becomes clear from FIGS. 1 to 3, a holding device according to the invention comprises an in the vertical section approximately L-shaped fastening panel 1, which is laterally defined by two side walls 2. By means of the fastening panel 1 the holding device is securable for example to an instrument panel of a vehicle.

In the lower section of the fastening panel 1 a tray 3 is supported to be folded-out between the two side walls 2, which tray 3 consists of a plate 4, which is horizontally arranged in the folded-out state (FIGS. 1, 2) with bearing projections 5, which are arranged on the plate on its panel side and which extend parallel to the side walls 2, and with an annular cylindrical wall 6, which protrudes upward. In the area of the bearing projections 5 bearing eyes 7 are provided, by means of which the tray 3 is seated on a bearing axle 9, which is supported between the two side walls 2 and which is parallel to the rear walls 8 of the fastening panel 1. The bearing axle 9 is secured by appropriate means, as for example by shims 10 and by snap rings 11 placed ahead. The tray 3 serves for receiving the bottom of a drinking container.

Above from the tray 3 the holder 13, which in plan view (FIGS. 4, 5) is shaped partially annularly, is equally foldably supported on the fastening panel 1 via two articulated levers 12, which are in alignment with each other in the lateral view, which levers are arranged within the side walls 2 parallel to the latter. The articulated levers 12 are articulated on the side of the panel on bearing extensions 14, which are injection-moulded in one piece to the rear wall 8 of the fastening panel 1. They are furthermore formed angularly, whereby in the folded-out position of the holder 13 (FIG. 1) their crown 15 is arranged above the link point, located on the holder side, of the articulated levers 12.

The articulated connection between the articulated levers 12 and the holder 13 is produced via lateral axle stubs 16, which protrude from the short outer surfaces 17, facing the side walls 2, of a base portion 18 of the holder 13. The axle stubs 16 are seated in the corresponding bearing eyes of the articulated levers 12.

Figure 5:
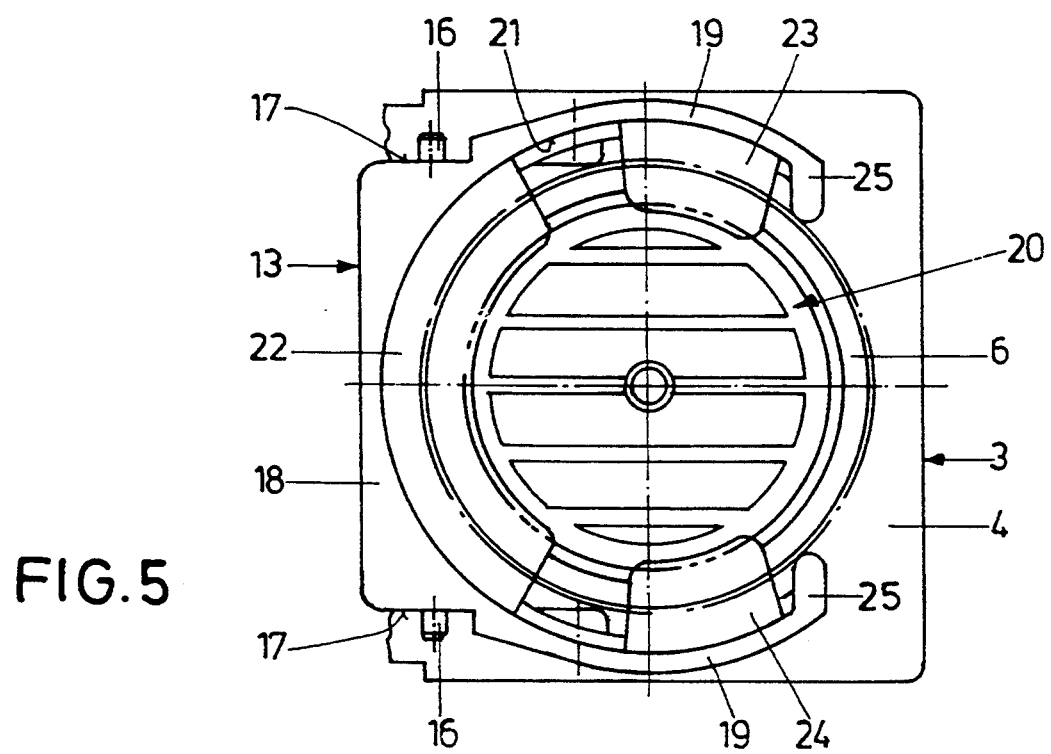
FIG. 5 shows a partial plan view onto the holding device corresponding to the direction of arrow V according to FIG. 1.

In the folded-out position of the holder, shown in FIGS. 1 and 5, this holder serves for grasping and laterally fixing a drinking container standing on the tray 3. For this purpose the holder 13 comprises two holding arms 19, which in plan view are designed partially circularly, and formed in one piece on the ends, adjacent to the axle stub 16, of the base portion 18. The holding arms form together with the base portion 18 a partially-circularly-shaped receiver opening 20 for a drink container, of which opening approximately three-quarters are closed. On its inner side 21 facing the drink container, which inner side circumscribes the receiver opening 20, the holder 13 is provided with three inwardly protruding, flexible holding tabs 22, 23, 24, which in plan view are formed like an annular sector. The central holding tab 22 extends substantially along the circumferential length, extending on the base portion 18, of the receiver opening 20. The two other short holding tabs 23, 24 are arranged before the free ends 25 of the holding arms 19. The holding tabs 22, 23, 24 are injection-moulded directly to the base portion 18 and the holding arms 19, respectively, of the holder 13. Due to their flexibility drink containers of different diameters (see continuous, dot-dashed and dash double-dotted contour in FIG. 5) can be held reliably and rattle-free with the aid of the holding device according to the invention.

As becomes clear from FIGS. 1 to 3, two additional connecting levers 26 are provided to articularly connect the tray 3 with the holder 13. They are pivotably supported on the bearing axle 9 on their tray side and abut with their end 27, located on the side of the tray, on the inner sides, facing each other, of the bearing projections 5 of the tray 3 while being influenced by the compression spring 28 seated on the bearing axle 9. Between the tray 3 and the two connecting levers 26 a releasable pivot locking is provided by a snap engagement according to the type of a groove-and-tongue-coupling, which pivot locking is formed by a web 29, forming the tongue, on the inner side of the bearing projections 5 and by a corresponding recess 30, forming the groove, in the end 27, which is located on the side of the tray, of the connecting lever 26. By this groove-and-tongue-coupling the tray 3 and the connecting lever 26 are pivotably coupled.

For an articulated connection of the connecting lever 26 with the holder 13 bearing projections 31 are provided in the vicinity of its holding arms 19 extending at right angles to their direction of extension (in the folded-out position corresponding to FIG. 1 towards below), which bearing projections 31 comprise axle stubs 32 directing laterally outward. These axle stubs 32 engage in each instance with an oblong hole 33 in the ends 34, located on the side of the holder, of the connecting lever 26. This results in that a rotary-slide joint is formed between the connecting lever 26 and the holder 13, which joint is arranged at a distance a from the link point of the holder 13 with regard to the fastening panel 1 - i.e. in the example of embodiment from the articulated connection between the articulated lever 12 and the base portion 11 of the holder 13. As a whole, the pivot axes of the synchronous folding mechanism formed by the articulated lever 12, the holder 13, the connecting lever 26 and the tray 3 are directed parallel to the rear wall 8 of the fastening panel 1 and are arranged towards each other in such a manner that the connecting levers 26 stand at an angle of approximately 60° to the horizontal line in the folded-out position of the tray 3 and of the holder 13 shown in FIG. 1.

The synchronous folding mechanism works as follows:

Based on the folded-out position of the tray 3 and the holder 13 shown in FIG. 1, these components can be moved together into the retracted position of tray 3 and holder 13 shown in FIG. 3 by pivoting in the tray 3. When pivoting the tray 3 by an angle of 90° about the bearing axle 9 the pivot movement is transferred to the holder 13 by the pivot coupling by means of the groove-and-tongue-coupling with the connecting lever 26, which holder 13 on this occasion pivots inward and downward in the opposite direction compared to the tray 3 as far as the articulated levers 12, the holder 13 itself and the connecting lever 26 are directed approximately parallel to the rear wall 8 of the fastening panel 1. This position is reached when the tray 3 stands obliquely upward at an angle of approximately 30° to the horizontal line. When further pivoting the tray 3 the groove-and-tongue-coupling between its bearing projections 5 and the connecting levers 22 is released by pressing inward the connecting levers 26 against the compression spring 28, the tray 3 can then be moved independent of the connecting levers 26 into the retracted, closed position shown in FIG. 3. When opening the holding device from the closed position shown in FIG. 3 the tray 3 the other way round is folded open first by 60°. In this position the bearing projections 5 engage with the connecting levers 26 by closing the groove-and-tongue-coupling, whereby when further pivoting the tray 3 into the horizontal position shown in FIG. 1 the holder 13 pivots into the folded-out position shown in FIG. 1 while correspondingly pivoting upward and rotating about the ends, located on the side of the holder, which shift downward and outward, of the articulated levers 12.

Contrary to the above-mentioned method of operation the holder 13 can also be retracted separately from the tray 3, as this is shown in FIG. 2. To this end the tray 3 is held tight and the holder 13 is pivoted inward. This pivot movement is transferred to the connecting levers 26, whereby the groove-and-tongue-connection with the bearing projections 5 of the tray 3 is released and the connecting levers 26 are equally pivoted inward. In the position shown in FIG. 2 the tray 3 can serve as a place of deposit for small parts—e.g. within the annular cylindrical wall 6. Starting from this position the tray 3 can be pivoted inward separately from the other components of the synchronous folding mechanism into the closed position shown in FIG. 3.

What is claimed is:

1. A holding device for drink containers in particular for installing in vehicles comprising
   a fastening panel (1),
   a bearing axle (9) on the fastening panel (1),
   a tray (3) pivotably supported on the bearing axle (9) to pivot between a folded-out and a retracted position for receiving the bottom of the drink container, and
   a holder (13), which is substantially at least partially annularly shaped and which grasps the side wall of the drink container, which holder (13) is supported above the tray (3) on the fastening panel (1) to pivot between a folded-out position for holding the drink container and a retracted position, whereby in its retracted position the holder is covered by the tray like forming a lid,
   at least one connecting lever (26) connecting the tray (3) and the holder (13) with each other in such an articulated manner that with the retracting and folding out movement, respectively, of the tray (3) the holder (13) is automatically movable into its retracted and folded-out position, respectively, wherein the tray (3) and the at least one connecting lever (26) are pivotably supported on the common bearing axle (9) and comprise a releasable pivot locking means (29, 30) between them for releasably coupling said tray (3) and connecting lever (26) in order to retract holder (13) automatically with or separately from the tray (3).

2. A holding device according to claim 1, comprising a compression spring (28) on the bearing axle (9), wherein the at least one connecting lever (26) is spring-loaded by compression spring (28) in a locking direction of the releasable pivot locking means (29, 30).

3. A holding device according to claim 1, wherein the at least one connecting lever (26) is connected with the holder (13) via a rotary-slide-joint (32, 33), which joint is arranged on the fastening panel (1) at a distance (a) from a link point of the holder (13) with regard to the fastening panel (1).

4. A holding device according to claim 1, wherein the holder (13) is pivotably articulated on the fastening panel (1) via at least one articulated lever (12).

5. A holding device for drink containers in particular for installing in vehicles comprising
   a fastening panel (1),
   a bearing axle (9) on the fastening panel (1),
   a tray (3) pivotably supported on the bearing axle (9) to pivot between a folded-out and a retracted position for receiving the bottom of the drink container, and
   a holder (13), which is substantially at least partially annularly shaped and which grasps the side wall of the drink container, which holder (13) is supported above the tray (3) on the fastening panel (1) to pivot between a folded-out position for holding the drink container and a retracted position, whereby in its retracted position the holder is covered by the tray like forming a lid,
   at least one connecting lever (26) connecting the tray (3) and the holder (13) with each other in such an articulated manner that with the retracting and folding out movement, respectively, of the tray (3) the holder (13) is automatically movable into its retracted and folded-out position, respectively, wherein the tray (3) and the at least one connecting lever (26) are pivotably supported on the common bearing axle (9) and comprise a releasable pivot locking means (29, 30) between them for releasably coupling said tray (3) and connecting lever (26) in order to retract holder (13) automatically with or separately from the tray (3), which releasable pivot locking means (29, 30) is formed by a snap engagement means according to a type of a groove-and-tongue-coupling (29, 30) between the at least one connecting lever (26) and an associated bearing projection (5) receiving the common bearing axle (9) on the tray (3).

6. A holding device according to claim 5, comprising a compression spring (28) on the bearing axle (9), wherein the at least one connecting lever (26) is spring-loaded by compression spring (28) in a locking direction of the releasable pivot locking means (29, 30).

7. A holding device according to claim 5, wherein the at least one connecting lever (26) is connected with the holder (13) via a rotary-slide-joint (32, 33) which joint is arranged on the fastening panel (1) at a distance (a) from a link point of the holder (13) with regard to the fastening panel (1).

8. A holding device according to claim 5, wherein the holder (13) is pivotably articulated on the fastening panel (1) via at least one articulated lever (12).

* * * * *